United States Patent
Jeanne et al.

(10) Patent No.: US 8,634,591 B2
(45) Date of Patent: *Jan. 21, 2014

(54) METHOD AND SYSTEM FOR IMAGE ANALYSIS

(75) Inventors: Vincent Jeanne, Eindhoven (NL); Ihor Olehovych Kirenko, Eindhoven (NL); Giovanni Cennini, Eindhoven (NL); Ling Shao, Sheffield (GB)

(73) Assignee: Koninklijke Philips N.V., Eindhoven (NL)

( * ) Notice: Subject to any disclaimer, the term of this patent is extended or adjusted under 35 U.S.C. 154(b) by 51 days.

This patent is subject to a terminal disclaimer.

(21) Appl. No.: 13/389,539

(22) PCT Filed: Aug. 9, 2010

(86) PCT No.: PCT/IB2010/053588
§ 371 (c)(1),
(2), (4) Date: Feb. 8, 2012

(87) PCT Pub. No.: WO2011/021128
PCT Pub. Date: Feb. 24, 2011

(65) Prior Publication Data
US 2012/0141000 A1 Jun. 7, 2012

(30) Foreign Application Priority Data
Aug. 20, 2009 (EP) .................................. 09168238

(51) Int. Cl.
*G06K 9/00* (2006.01)

(52) U.S. Cl.
USPC ............................ 382/103; 382/115; 382/128

(58) Field of Classification Search
None
See application file for complete search history.

(56) References Cited
U.S. PATENT DOCUMENTS
4,958,638 A 9/1990 Sharpe et al.
(Continued)

FOREIGN PATENT DOCUMENTS
CN 1613425 A 5/2005
(Continued)

OTHER PUBLICATIONS
Arun Ross et al: "Handbook of Multibiometrics"; Jan. 2006, International Series of Biometrics, Jan. 2006, pp. 52-53, 56.
De Haan et al: "True-Motion Estimation With 3-D Recursive Search Block Matching"; IEEE Transactions on Circuits and Systems for Video Technology, vol. 3, No. 5, Oct. 1993, pp. 369-388.
(Continued)

*Primary Examiner* — Bhavesh Mehta
*Assistant Examiner* — Siamak Harandi (57) ABSTRACT

A method of image analysis, includes: obtaining a sequence (37;51) of images, each represented by pixel data; performing a vision-based analysis on at least one of the sequence (37;51) of images to obtain data for classifying a state of a subject represented in the images;—determining at least one value of a physiological parameter of a living being represented in at least some of the sequence (37;51) of images; and classifying a state of the subject using the data obtained with the vision-based analysis and the at least one value of the physiological parameter. The at least one value of the physiological parameter is determined through analysis of image data from the same sequence (37;51) of images from which the at least one image on which the vision-based analysis is performed is taken. A method of enabling remote photoplethysmographic analysis includes: obtaining a sequence (37;51) of images from at least one camera (3), each represented by pixel data representative of reflected ambient light in at least a limited range of wavelengths; and, for at least one measurement zone (41), providing a signal representative of at least variations in a time-varying value of a combination of pixel values at least a number of image points in the measurement zone (41) for use in determining at least one value of a physiological parameter. At least part of a selected subject represented in the sequence (37;51) of images is tracked, and a directable light source (4) illuminating at least part of the selected subject is controlled.

14 Claims, 5 Drawing Sheets

(56) References Cited

U.S. PATENT DOCUMENTS

| | | | |
|---|---|---|---|
| 5,507,291 | A | 4/1996 | Stirbl et al. |
| 5,582,168 | A | 12/1996 | Samuels et al. |
| 5,719,950 | A | 2/1998 | Osten et al. |
| 6,067,399 | A | 5/2000 | Berger |
| 6,996,256 | B2 | 2/2006 | Pavlidis |
| 7,904,139 | B2 | 3/2011 | Chance |
| 2004/0218787 | A1 | 11/2004 | Tagami et al. |
| 2005/0054935 | A1 | 3/2005 | Rice et al. |
| 2005/0089206 | A1 | 4/2005 | Rice et al. |
| 2005/0113673 | A1 | 5/2005 | Avinash et al. |
| 2005/0113674 | A1 | 5/2005 | Salla et al. |
| 2008/0045847 | A1 | 2/2008 | Farag et al. |
| 2008/0227203 | A1 | 9/2008 | Watanabe et al. |
| 2008/0260212 | A1* | 10/2008 | Moskal et al. ............... 382/118 |
| 2009/0027493 | A1 | 1/2009 | Amar et al. |
| 2009/0082642 | A1 | 3/2009 | Fine |
| 2009/0141124 | A1 | 6/2009 | Liu et al. |
| 2009/0225827 | A1 | 9/2009 | Sang et al. |
| 2009/0306484 | A1 | 12/2009 | Kurtz et al. |
| 2010/0041968 | A1 | 2/2010 | Meschisen et al. |
| 2010/0198112 | A1 | 8/2010 | Maad |
| 2010/0266213 | A1* | 10/2010 | Hill ............................ 382/218 |
| 2011/0251493 | A1 | 10/2011 | Poh et al. |

FOREIGN PATENT DOCUMENTS

| | | |
|---|---|---|
| CN | 1814322 A | 8/2006 |
| CN | 101112307 A | 1/2008 |
| CN | 101299967 A | 11/2008 |
| EP | 1764034 A2 | 3/2007 |
| EP | 2087837 A1 | 8/2009 |
| WO | 8804152 A1 | 6/1988 |
| WO | 9932030 A1 | 7/1999 |
| WO | 0044274 A2 | 8/2000 |
| WO | 0167960 A2 | 9/2001 |
| WO | 2004093676 A1 | 11/2004 |
| WO | 2005051190 A1 | 6/2005 |
| WO | 2008129482 A2 | 10/2008 |
| WO | 2010071738 A1 | 6/2010 |
| WO | 2010100594 A2 | 9/2010 |
| WO | 2011042839 A1 | 4/2011 |

OTHER PUBLICATIONS

Verkruysse et al: "Remote Plethysmographic Imaging Using Ambient Light"; Optics Express, vol. 16, No. 26, Dec. 2008, pp. 21434-21445.

Niebles et al: "Unsupervised Learning of Human Action Categories Using Spatial-Temporal Words"; Int. J. Comp. Vision, vol. 79, Issue 3, Sep. 2008, pp. 299-318.

Hulsbusch: Ein Bildgestutztes, Funktionelles Verfahren zur Optoelektronischen Erfassung der Hautperfusion; Dissertation, Jan. 28, 2008, 145 Page Document.

Jens-Rainer: "Multimedia Communication Technology"; Multimedia Communication Technology, Jan. 2004, pp. 297-310.

Lucchese et al: "Color Image Segmentation: A State-Of-The-Art Survey"; Proceedings of the Inidian National Science Academy, New Dehli, India, Part A. Physical Sciences, vol. 67. No. 2, Mar. 1, 2001, pp. 207-2212.

Hu et al: "Feasibility of Imaging Photoplethysmography"; 2008 International Conference on Biomedical Engineering and Informatics; May 2008, pp. 72-75.

Wieringa et al: "Contactless Multiple Wavelength Photoplethysmographic Imagin: A First Step Toward "SpO2 Camera" Technology"; Annals of Biomedical Engineering, Aug. 2005, Nov. 33, No. 8, pp. 1034-1041.

Viola: et al: "Robust Real-Time Object Detection"; Proceedings of IEEE Second Internatioanal Worskhop on Statistical and Computational Theories of Vision-Modeling, Learning, Computing, and Sampling, Vancouver, Cananda, Jul. 2001, 25 Page Article.

Takano et al: "Heart Rate Measurement Based on a Time-Lapse Image"; Science Direct, Medical Engineering & Physics, vol. 29, 2007, pp. 853-857.

Yang et al: "Vital Sign Estimation From Passive Thermal Video"; IEEE Conference on Computer Vision and Pattern Recognition, 2008, CVPR, Jun. 2008, pp. 1-8.

Mohan et al: "Contact-Less, Multi-Spectral Imaging of Dermal Perfusion"; L IEEE Instrumentation and Measurement Technology Conference, May 2008, Vancouver, Canada, pp. 793-796.

Viola et al: "Robust Real-Time Face Detection"; International Journal of Computer Vision, vol. 57, No. 2. pp. 137-154, 2004.

* cited by examiner

FIG. 6

METHOD AND SYSTEM FOR IMAGE ANALYSIS

FIELD OF THE INVENTION

The invention relates to a method of image analysis, a system for image analysis, and a computer program. The invention also relates to a method and system for enabling remote photoplethysmographic analysis.

BACKGROUND OF THE INVENTION

US 2009/0027493 A1 discloses a method to automate the surveillance of people entering public spaces and taking action in real-time to prevent an attacker from achieving his target. The method includes the strategic placement of high-resolution video cameras in places that are camouflaged from vision. Cameras would be connected by land lines or wirelessly to a central location that would monitor the films recorded. The routine monitoring would be for the most part automatic and computer-controlled. The computer monitoring would include analysis of people's behavior, facial expression, unusual movement and the like. Suspect noise, words or volume could also alert the computer program to warn the trained personnel to focus in on the events at that site. Where possible, analysis of more intricate factors like the heart beat rate or pupil dilation could be monitored and displayed on a sub-screen.

A problem of the known method is that it does not disclose how to obtain the heart beat rate or pupil dilation and how to synchronize data representative of such factors with the video footage used for analysis of suspicious behavior.

SUMMARY OF THE INVENTION

It is desirable to provide a method, system and computer program, which can be implemented efficiently to obtain a relatively reliable classification of an activity of a subject represented in a sequence of images.

This object is achieved by the method according to the invention, which includes:
  obtaining a sequence of digital images;
  performing a vision-based analysis on at least one of the sequence of images to obtain data for classifying a state of a subject represented in the images;
  determining at least one value of a physiological parameter of a living being represented in at least some of the sequence of images, wherein the at least one value of the physiological parameter is determined through analysis of image data from the same sequence of images from which the at least one image on which the vision-based analysis is performed is taken; and
  classifying a state of the subject using the data obtained with the vision-based analysis and the at least one value of the physiological parameter.

The term activity is used herein to denote a set of one or more actions, which may include expressions and behavior, of a living being, e.g. a human. Thus, the categorization may assign a type to an action, e.g. "running", to an expression, e.g. "smiling", or behavior, e.g. "agitated" or "suspicious". Vision-based analysis involves at least one of spatial and spatiotemporal analysis.

By performing a vision-based analysis on at least one of the sequence of images to obtain data for classifying at least one activity of a subject represented in the image and determining at least one value of a physiological parameter of a living being represented in at least some of the sequence of images, two relatively independent methodologies are used to obtain data for automated classification of human activities. Each resolves the ambiguity that may result when only one of them is applied. For example, a high heart rate accompanies activities like running, swimming. Running and jogging involve similar poses that cannot be easily distinguished using vision-based analysis. Because the at least one value of the physiological parameter is determined through analysis of image data from the same sequence of images from which the at least one image on which the vision-based analysis is performed is taken, the method is relatively efficient. Separate sensors, in addition to at least one camera to obtain the sequence of images, are not required. Moreover, means for synchronizing sensor signals with the images are also not required, due to the use of the same sequence of images. An additional effect is that the physiological parameter is determined in an unobtrusive manner. The measurement is contactless, just like the vision-based analysis, so that the method does not affect the activity of the subject. A further effect is that the method can be scaled to classify the activity of more than one person (provided they are both represented in the sequence of images) with relatively little additional effort.

In an embodiment, classifying the state of the subject comprises classifying an action being undertaken by the subject.

This is a useful implementation of the method, because different actions are often characterized by similar poses, so that vision-based image analysis of human activity alone will often lead to the wrong classification result. In other words, vision-based analysis systems are often not able to distinguish between different types of actions, e.g. running and jogging.

In an embodiment, separate classifiers are applied to data based on the values of the physiological parameters and data obtained by performing the vision-based analysis.

An effect of providing separate classifiers for the data based on the values of the physiological parameters and for the data obtained by performing the vision-based analysis, is that it is possible to use only one of the two types of analysis without the other. This would be computationally more efficient, in that one of the two methods will in many situations yield an unambiguous result. Only where this is not the case would the other classifier be used, in addition to a further classifier that makes use of the outcomes of both classifiers to produce a final result.

In an alternative embodiment, a single classifier is applied to a combination of data based on the values of the physiological parameters and data obtained by performing the vision-based analysis.

This has the effect that correlations between the values of the physiological parameter and the data obtained by performing the vision-based analysis can be used in the classification process. The single classifier can be trained on a combined data set (i.e. both values of physiological parameters and data obtained by performing vision-based analysis).

In an embodiment, the at least one value of a physiological parameter of a living being represented in at least some of the sequence of images is obtained using remote photoplethysmographic analysis.

In particular where the photoplethysmographic analysis is carried out in the visible frequency range, a normal camera, e.g. one comprising a CCD or CMOS sensor array, can be used to obtain the sequence of images. This is also useful because vision-based image analysis generally relies on the detection of edges, which may not be present in e.g. thermal images. Moreover, special directed light sources are not required to implement a basic form of remote photoplethysmographic analysis.

An embodiment includes illuminating at least part of the living being with a light source arranged to emit light in a limited sub-range of a visible spectrum.

It has been found that the best wavelength range to detect heart rate remotely using an image sensor is located around 500 nm (the green part of the visible spectrum). Thus, providing additional light for reflection off the subject in this range will maximize the signal when a remote heart rate measurement is being carried out. A channel of a camera used to obtain the sequence of images can be tuned to a wavelength range corresponding to the wavelength range in which the directable light source is arranged to emit light. Pixel data in only this channel can be used to obtain the signal representative of at least variations in a time-varying value of a combination of pixel values at least a number of associated image points in the measurement zone. Alternatively, pixel data in this channel can be overweighed in a weighted sum of pixel data from multiple channels. On the other hand, the vision-based image analysis can be carried out on pixel data comprising a weighted combination of pixel data from multiple channels in which the channel tuned to the wavelength range corresponding to that of the directable light source is slightly underweighted, so that the effect of the additional illumination is lessened.

In a variant, the remote photoplethysmographic analysis includes:

selecting at least one measurement zone including a plurality of image points, each with at least one associated pixel value in each of the sequence images; and obtaining a signal representative of at least variations in a time-varying value of a combination of pixel values at least a number of associated image points in the measurement zone.

This variant has the effect that a signal relatively free of noise and with a relatively strong signal component representative of variations in skin reflectance is obtained. This signal component is usable to determine e.g. the heart rate and/or respiration rate of a subject represented in the sequence of images.

An embodiment includes performing vision-based image analysis on the sequence of images to track at least part of a selected subject represented in the sequence of images, and controlling a directable light source illuminating at least part of the selected subject.

Performing vision-based image analysis on the sequence of images to track at least part of a selected subject represented in the sequence of images and controlling a directable light source illuminating at least part of the selected subject allows one to avoid shadows, since the light source can be directed at a part of the living being comprising the measurement zone. Moreover, where there are several living beings represented in the sequence of images, selective illumination of at least part of one of them contributes to providing a signal for use in determining values of a physiological parameter of only one of them.

An embodiment of the method includes selecting the part of the selected subject by analyzing at least some of the pixel data representing at least one of the sequence of images.

This analysis can be at least one of analysis to determine values of a physiological parameter, analysis to detect a type of behavior and analysis to detect the presence of a representation of an exposed body part, for example. This variant allows a completely automated system to determine a suitable target for additional illumination, whereupon activity classification using e.g. remote photoplethysmography and vision-based analysis is carried out. For example, a system can detect that someone with an abnormal heart rate or someone exhibiting a particular kind of behavior is represented in the sequence of images, and then track this person to determine his or her activities.

According to another aspect, the system for image analysis according to the invention includes:

an interface for obtaining a sequence of images, each represented by pixel data;

a first image analysis system for performing a vision-based analysis on at least one of the sequence of images to obtain data for classifying at least one action of a subject represented in the images; and a system for determining at least one value of a physiological parameter of a living being represented in at least some of the sequence of images, which system for determining the at least one value of the physiological parameter comprises a second image analysis system for determining the at least one value of the physiological parameter by means of analysis of image data from the same sequence of images from which the at least one image on which the vision-based analysis is performed is taken, wherein the system for image analysis is configured to classify an activity of the subject using the data provided by the first image analysis system and the at least one value of the physiological parameter.

In an embodiment, the system is arranged to carry out a method according to the invention.

According to another aspect of the invention, there is provided a computer program including a set of instructions capable, when incorporated in a machine readable medium, of causing a system having information processing capabilities to perform a method according to the invention.

Tracking a Person with a Light Source to Avoid Shadows

Verkruysse et al., "Remote photoplethysmographic imaging using ambient light", *Optics Express* 16 (26), December 2008, pp. 21434-21445, discloses a method in which photoplethysmography signals are measured remotely on the human face with normal ambient light as the source and a simple digital, consumer-level photo camera in movie mode. Color movies, recorded at either 15 or 30 frames per second and pixel resolution of 640×480 or 320×240 were save in AVI format by the camera and transferred to a personal computer. Using software, pixel values for the red, green and blue channels were read for each movie frame, providing a set of PV(x,y,t), where x and y are horizontal and vertical positions, respectively, and t is time corresponding to the frame rate. Using a graphic user interface, regions of interest (ROI) were selected in a still and the raw signal $PV_{raw}(t)$ was calculated as the average of all pixel values in the ROI. Fast Fourier Transforms were performed to determine the power and phase spectra.

A problem of the known method is that ambient illumination may lead to shading in the region being used for photoplethysmographic analysis, making the results less reliable or requiring additional image processing.

According to a further aspect hereof, a method and system provide a signal for photoplethysmographic analysis that has a relatively strong and clear component from which a physiological parameter such as the pulse rate or respiration rate of an individual represented in the images can be determined.

According to the further aspect of the invention, the method includes:

obtaining a sequence of images from at least one camera, each represented by pixel data representative of reflected ambient light in at least a limited range of wavelengths;

for at least one measurement zone, providing a signal representative of at least variations in a time-varying value of a combination of pixel values at least a number of image points in the measurement zone for use in determining at least one value of a physiological parameter; and tracking at least part of a selected subject represented in the sequence of images, and controlling a directable light source illuminating at least part of the selected subject.

Vision-based analysis involves at least one of spatial and spatiotemporal analysis.

By obtaining a sequence of images from at least one camera, each represented by pixel data representative of reflected ambient light in at least a limited range of wavelengths and, for at least one measurement zone, providing a signal representative of at least variations in a time-varying value of a combination of pixel values at least a number of image points in the measurement zone for use in determining at least one value of a physiological parameter, the method allows the use of a camera such as a CCD or CMOS-based camera to determine variations in reflectance of the skin of a living being. Thus, it is not necessary to provide a modulated illumination signal, nor is it necessary to separate only a reflected modulated illumination signal from a signal from a sensor. Tracking at least part of a selected subject represented in the sequence of images and controlling a directable light source illuminating at least part of the selected subject allows one to avoid shadows, since the light source can be directed at a part of the living being comprising the region of interest. Moreover, where there are several living beings represented in the sequence of images, selective illumination of at least part of one of them contributes to providing a signal for use in determining values of a physiological parameter of only one of them. Furthermore, the light source can be configured to emit light in a range of the spectrum that is particularly suited to photoplethysmography, thus also providing a stronger signal.

It is known to track a person with a modulated beam of light and to capture the reflected modulated beam of light in order to determine a physiological parameter. In that case, all non-modulated light is removed from the captured signal. Thus, ambient light is not used in addition to the beam of light. An interruption of this beam will lead to a temporary failure of the method. Also, a special, sensitive sensor is generally used to capture the reflected beam of light. The method of the present invention uses a camera and a combination of pixel values to obtain a strong enough signal for determining a value of a parameter characterizing a (periodic) physiological phenomenon.

In an embodiment, the directable light source is arranged to emit light in a limited sub-range of a visible part of a spectrum of light.

Skin reflectance changes more strongly with blood perfusion changes for certain frequencies. The use of a colored light source allows one to optimize the method to obtain an intensity signal in which the components varying with skin reflectance are stronger.

In a variant, image data is received in a plurality of channels from a camera having one of the channels tuned to the limited sub-range.

Thus, the step of providing a signal representative of at least variations in a time-varying value of a combination of pixel values at least a number of image points in the measurement zone for use in determining at least one value of a physiological parameter can comprise one of (i) only using pixel values from the tuned channel or (ii) forming the sum as a weighted combination of pixel values from the different channels, wherein the pixel values from the tuned channel are overweighed. This allows one to obtain an intensity signal with strong components representative of varying skin reflectance values.

An embodiment includes analyzing at least one of the sequence of images to select at least part of the selected subject.

The analysis can be an analysis to determine physiological parameter values of all subjects represented in the sequence of images, so as to select at least one but fewer than all of them, based on a certain criterion. The analysis can also be a vision-based analysis to identify bodies or body parts with a particular posture, shape or pattern of motion. These types of analysis can be automated, so that this embodiment is suitable for an automatic surveillance system, e.g. for medical or security purposes.

In an embodiment, tracking at least part of a selected subject includes performing vision-based analysis on the images to follow the position of a region representing the at least part of the selected subject in the sequence of images.

An effect is that a single moving measurement zone can be used, so that only one intensity signal representative of at least variations in a time-varying value of a combination of pixel values needs to be obtained. It is not necessary to overlay a grid of measurement zones on the images in order to be sure that values of a physiological parameter of only the selected subject are determined.

In an embodiment, the directable light source is fixed in position relative to the camera, and controlling the directable light source includes controlling a device for changing a viewing direction of the camera.

Effects of this embodiment are that changing the viewing direction changes the direction of the light emitted by the light source. Thus, most of the light is also reflected back in the direction of the camera. This means that there is little shadow, and that a relatively strong signal representative of variations in skin reflectance is obtained. The viewing direction of the camera is controlled by moving a camera housing relative to a support of the camera, with the directable light source being fixed in position relative to the housing.

According to another aspect, the system for enabling remote photoplethysmographic analysis according to the invention includes:

at least one camera interface for obtaining a sequence of images from at least one camera, each image represented by pixel data representative of reflected ambient light in at least a limited range of wavelengths; and a system for processing the pixel data, configured to provide, for at least one measurement zone, a signal representative of at least variations in a time-varying value of a combination of pixel values at least a number of image points in the measurement zone for use in determining at least one value of a physiological parameter;

a system for tracking at least part of a selected subject represented in the sequence of images; and a system for controlling a directable light source illuminating at least part of the selected subject.

In an embodiment, the system is configured to execute a method according to the invention.

According to another aspect of the invention, there is provided a computer program including a set of instructions capable, when incorporated in a machine readable medium, of causing a system having information processing capabilities to perform a method according to the invention.

BRIEF DESCRIPTION OF THE DRAWINGS

The invention will now be explained in further detail with reference to the accompanying drawings, in which.

DETAILED DESCRIPTION

Figure 1:
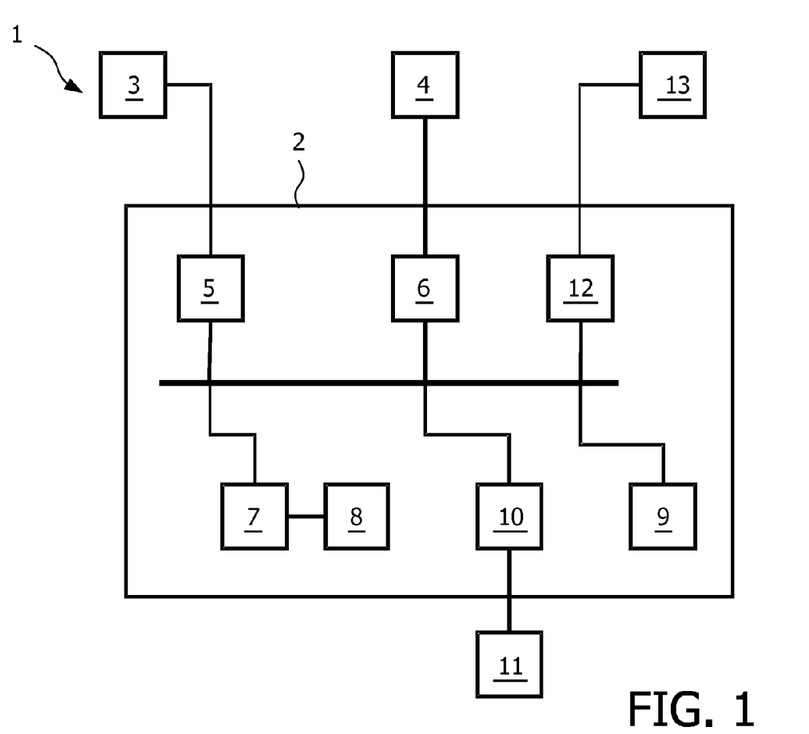
FIG. 1 is a schematic block diagram of a system for classifying a state of action of an individual represented in a sequence of images.

A system 1 for classifying a state of a living being is shown by way of example as comprising a computer 2, a camera 3 and a directable light source 4.

The computer 2 can be any type of computing device, e.g. a personal computer, except that it is provided with a camera interface 5 and an interface 6 to the light source 4. Thus, the computer 2 comprises a data processing unit 7 and working memory 8, as well as a non-volatile data storage device 9. Output is provided on an interface 10 to an output device 11 for providing at least one of audible and visible output. User input is obtained via an interface 12 to a user input device 13, e.g. a keyboard, touch screen or pointer device. The camera interface 5 enables the computer 2 to obtain digital data representative of a sequence of images captured by the camera 3, and to send control signals to the camera 3. The light source interface 6 allows the computer 2 to control the light source 4. Images are represented by pixel data.

In one embodiment (not shown in detail), the directable light source 4 is a device comprising a housing for one or more lamps, a support connected to the housing and one more actuators for moving the housing relative to the support. The support can be a pedestal or bracket for fixing the light source 4 in position. Control signals from the computer 2 control the actuators. In another embodiment, the housing does not move, but reflective and/or refractive optical elements are provided for directing a beam of light generated in the light source 4 to a desired location.

In an embodiment, the light source 4 is fixed in position relative to the camera 3, and the camera 3 is movable relative to a support (e.g. a pedestal or bracket). In such an embodiment, the light source 4 is arranged to direct a beam of light at a point at which the camera 3 is also directed.

In an embodiment, the light source 4 is configured to emit light in the visible range of the electromagnetic spectrum, more particularly to emit light with the majority of energy (e.g. 70%, 80% or even 90%) in only a sub-range of this range. In an embodiment, the sub-range includes frequencies perceived as green by a human observer, i.e. frequencies corresponding to a wavelength of between 450 and 570 nm. In a particular embodiment, the spectrum of the light source 4 has a maximum within the range between 480 and 520 nm. An effect is that the system 1 is able to determine the heart rate of a living being present in a scene captured by the camera 3 with more accuracy.

The camera 3 can be any type of digital camera configured to capture images in at least the visible range of the electromagnetic spectrum. In an embodiment, the camera is arranged to provide an image in a plurality of channels, e.g. three channels, and one of the channels is tuned to a limited sub-range of the visible spectrum corresponding to the sub-range in which the light source 4 is arranged to emit light. To this end, the camera 3 is provided with an appropriate optical filter for that channel. As known to the skilled person, a channel is a monochrome image for forming a color image. In addition to the tuned channel, there can, for example, be a red and a blue channel.

In all other respects, the camera 3 can be a conventional digital video camera based e.g. on CCD or CMOS technology.

Figure 2:
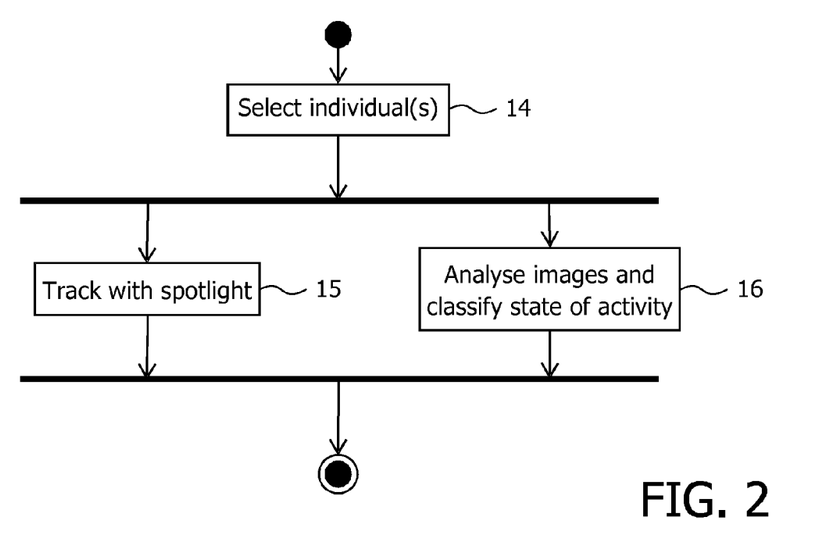
FIG. 2 is a flow chart giving an overview of a method carried out by the system of FIG. 1.

As set out in FIG. 2, the system 1, more particularly the computer 2, is arranged to select one or more living subject(s) represented in a scene being captured by the camera 3 (step 14). The selection can be implicit in that the computer selects a body part represented in the scene (e.g. a face or any body part with exposed skin and optionally meeting one or more criteria). In one embodiment, a human operator carries out the selection by providing appropriate user input via the input device 13. One or more of the sequence of images can be displayed on the output device 11 to guide the operator in this process. In another embodiment, the computer 2 analyses at least one of the sequence of images to select the individual or part of the individual. For example, the computer 2 can carry out image segmentation, and then use one or more classification algorithms to determine of each segment whether it is a segment representing a skin surface of a living being. This yields a set of candidate segments. In one variant, further criteria are evaluated to select one or more of the candidate segments determined to correspond to a skin surface of the living being. In another variant, the most homogeneous candidate segment is chosen. In yet another variant, one of the candidate segments detected as representing part of a living subject is chosen at random. It is noted that other types of vision-based analysis to select candidate segments can be used.

In another embodiment, motion detection is used to determine regions corresponding to moving objects. This again yields one or more candidate regions for tracking, of which one or more may be selected at random or using further criteria.

Alternatively, the computer 2 can be configured to determine a sequence of one or more values of a physiological parameter characterizing a living being and to use the values to select a living being to be tracked. For example, a living being having a heart rate or respiration rate with a value within a certain range can be selected for tracking. Combinations of these methods are possible. For example, a living being selected on the basis of one or more values of a physiological parameter can be highlighted on a screen to allow a human operator to confirm the selection of the living being.

Once a living being or part of a living being has been selected, the directable light source 4 is controlled to illuminate at least part of the selected subject represented in the images being captured by the camera 3 as this subject moves (step 15). At the same time, images captured by the camera 3 and passed to the computer 2 are analyzed in order to classify a state of the subject using both vision-based analysis and a determination of at least one value of a physiological parameter characterizing the subject (step 16).

As already mentioned, the step 15 of controlling the directable light source in one embodiment includes moving the camera 3 with the light source 4 attached to it, so that the beam from the light source 4 remains generally fixed on at least part of the selected subject. In this embodiment, the selected part of a subject is tracked using vision-based analysis, and the camera 3 is controlled to ensure that the part remains at generally the same position in each of the images captured by the camera 3.

In another embodiment the light source 4 and the camera 3 are placed at different positions, and a calibration pattern is used to derive equations that model the environment of the camera 3 and the light source 4, and allow the computer 2 to map positions in one model into positions in the other model. The computer 2 tracks the selected part of the subject by means of vision-based image analysis, and converts the movement by the subject into instructions for directing the beam from the light source 4.

In yet another embodiment, use is made of the channel of the video signal that is tuned to a limited sub-range of the visible spectrum corresponding to the sub-range in which the light source 4 is arranged to emit light. In this embodiment, a form of closed-loop control is implemented, in that the position of the beam spot is tracked in the images, at least in the frames forming components of the images in the tuned channel. The selected part of the subject being tracked is also identified, and the light source 4 is controlled such that the beam spot overlies the selected part.

Vision-based image analysis to track a selected part of an image can be carried out using any one of a number of known techniques, for example the one described in De Haan, G. et al., "True motion estimation with 3D-recursive search block-matching", *IEEE Trans. on Circ. and Syst. from Video Techn.*, Vol. 3, October 1993, pp. 368-388.

Figure 3:
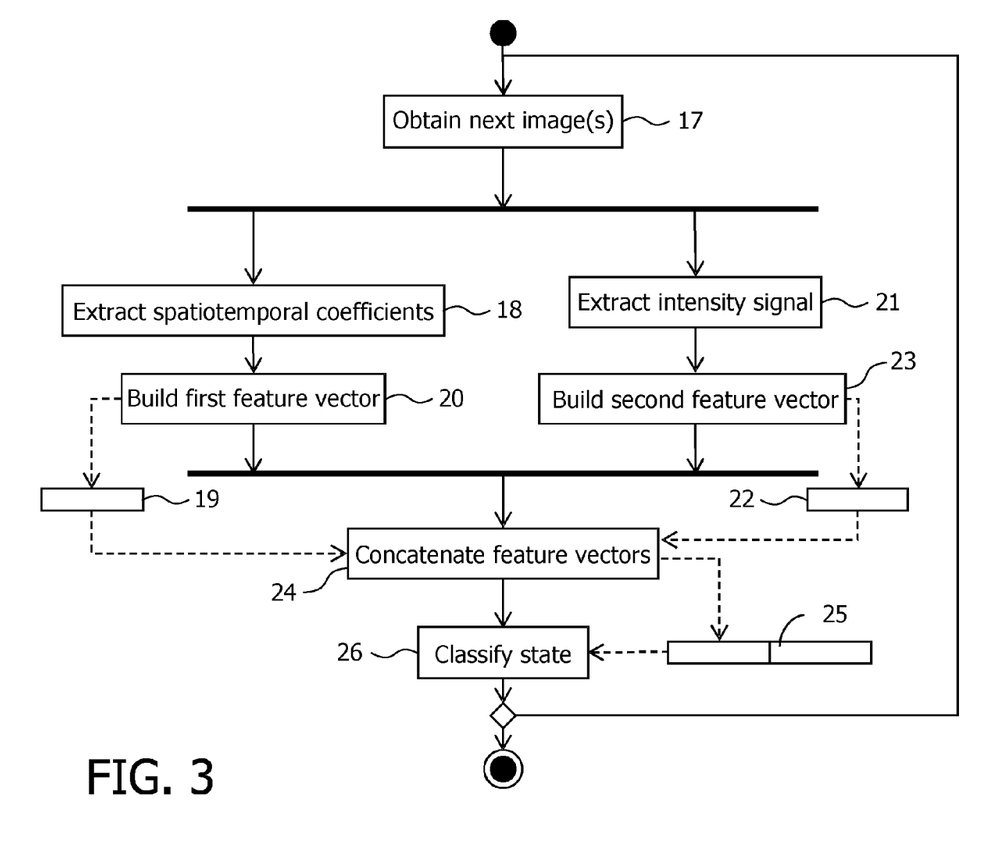
FIG. 3 is a flow chart detailing a classification step in the method of FIG. 2.

In an embodiment, the step 16 of analyzing images and classifying a state of activity is implemented in accordance with FIG. 3. In this embodiment, the computer 2 performs a vision-based analysis on at least one of a sequence of images captured by the camera 3 to obtain data for classifying a state of a living being represented in the image or images. The computer also determines at least one value of a physiological parameter of the living being using images from the same source, namely the camera 3. The computer 2 implements a classification algorithm that takes both data based on data obtained by applying the vision-based analysis and data based on the values of the physiological parameters as input and outputs data indicative of a type of state, more particular a type of action being taken by the subject.

As shown in FIG. 3, the method is carried out continually as new images are received (step 17) from the camera 3. A sub-sequence formed from the images received most recently is used for the analysis. The method can also be carried out each time a certain number of images have been received, rather than with each new image.

In the illustrated embodiment, a type of spatiotemperal analysis as described e.g. in Niebles, J. C. et al., "Unsupervised learning of human action categories using spatial-temporal words", *Int. J. Comp. Vision*, 79 (3), September 2008, pp. 299-318, is used (step 18). In this method, a sequence of images is represented as a collection of spatio-temporal words by extracting space-time interest points. In the embodiment of FIG. 3, sets of such words are assembled into first feature vectors 19 (step 20).

Using images from the same sequence of images from which images were analyzed in the parallel step 18 (there need not be identity of images: just identity of the source of the images and synchronization in that the images are from the same time interval), an intensity signal is extracted (step 21) using one of the methods of FIGS. 5 and 6, to be discussed in detail below. The intensity signal is representative of at least variations in a time-varying value of a combination of pixel values at least a number of image points in a measurement zone, the measurement zone being located in the region being tracked and, at least in the method of FIG. 2, illuminated.

The human skin can be modeled as an object with at least two layers, one of those being the epidermis (a thin surface layer) and the other the dermis (a thicker layer underneath the epidermis). Approximately 5% of an incoming ray of light is reflected in the epidermis, which is the case for all wavelengths and skin colors. The remaining light is scattered and absorbed within the two skin layers in a phenomenon known as body reflectance (described in the Dichromatic Reflection Model). The epidermis behaves like an optical filter, mainly absorbing light. In the dermis, light is both scattered and absorbed. The absorption is dependent on the blood composition, so that the absorption is sensitive to blood flow variations. The optical properties of the dermis are generally the same for all human races. The dermis contains a dense network of blood vessels, about 10% of an adult's total vessel network. These vessels contract according to the blood flow in the body. They consequently change the structure of the dermis, which influences the reflectance of the skin layers. Consequently, the heart rate can be determined from skin reflectance variations.

The intensity signal is used to build a second feature vector 22 (step 23). This feature vector 22 can, for example, comprise a sequence of values representative of the intensity signal or one or more values corresponding to at least one of the dominant frequency of the intensity signal and an estimation of a change in value of the dominant frequency. The values in one embodiment correspond to successive points in time. In an embodiment, several dominant frequencies in different sub-ranges of the spectrum of the intensity signal are entered into the feature vector 22. Thus, values characterizing two or more periodic physiological phenomena are used as a basis for determining the state of a living (human) being.

Then (step 24), the first feature vector 19 and the second feature vector 22 are concatenated to form a joint feature vector 25 for use as input to a classification algorithm. This algorithm is subsequently applied (step 26) to determine the state of the subject being tracked, in particular the action being performed by this subject.

In one embodiment the classification algorithm is implemented by a support vector machine. In another embodiment, AdaBoost is used as a classification algorithm. Any other type of machine learning algorithm can be used. The algorithm is first trained using training videos and a human classifier, in a process not illustrated in detail here. The process illustrated in FIG. 3 uses a classifier that can also use correlations between the physiological signal and spatiotemporal coefficients to determine the state a user is in.

Figure 4:
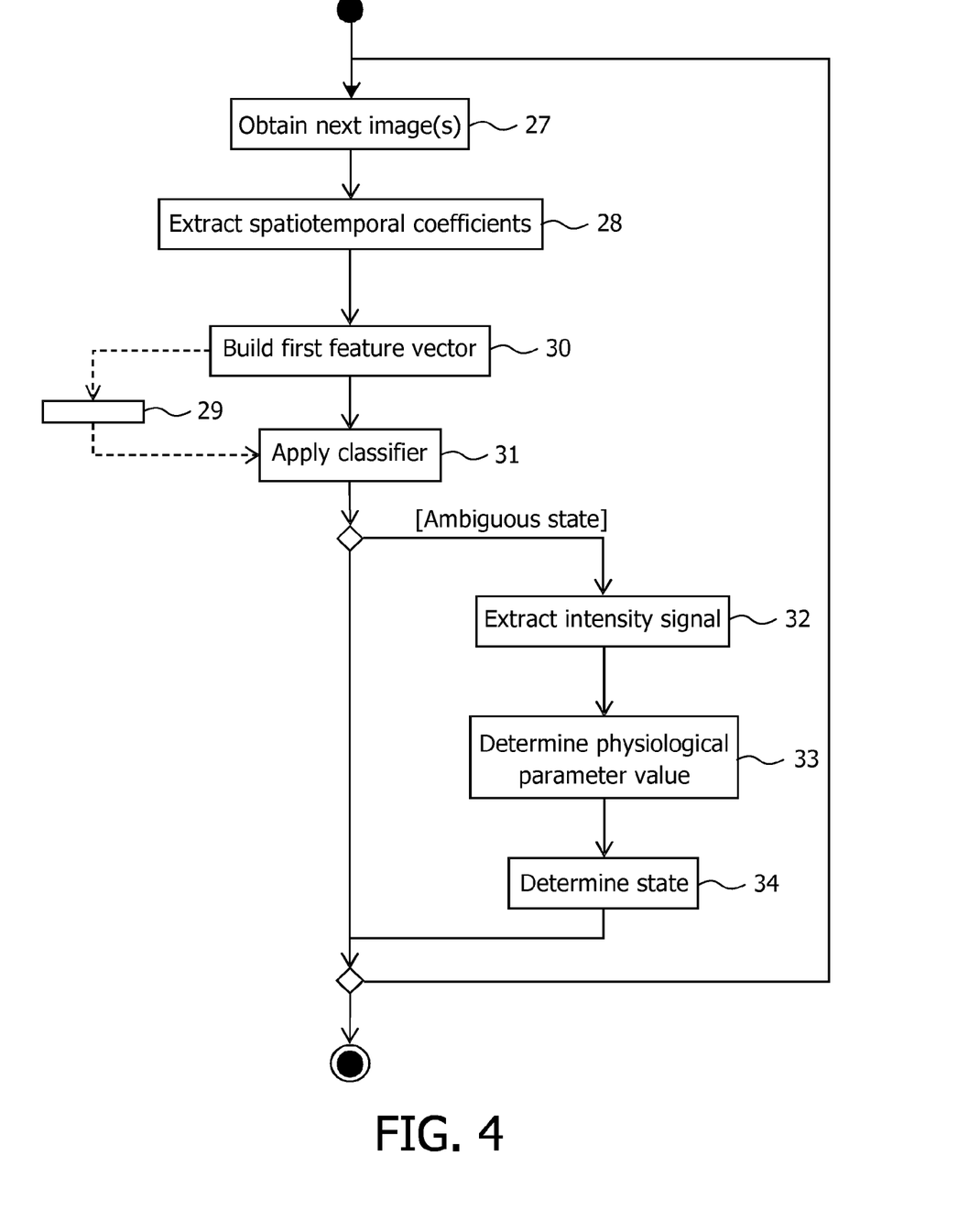
FIG. 4 is a flow chart detailing an alternative implementation of the classification step in the method of FIG. 2.

This is not necessarily the case for the alternative method illustrated in FIG. 4. However, the method of FIG. 4 can be faster and computationally more efficient. In this method, a sequence of images is again formed (step 27), and spatiotemporal coefficients are obtained (step 28) using a method as described, for example, in Niebles, J. C. et al., "Unsupervised learning of human action categories using spatial-temporal words", *Int. J. Comp. Vision*, 79 (3), September 2008, pp. 299-318. Then, a first feature vector 29 is again built (step 30).

Next, a first, separate classifier is applied (step 31) to the first feature vector 29. This classifier is also based on at least one machine learning algorithm. In certain cases it may yield ambiguous results. For example, it is relatively difficult to determine whether a person represented in a sequence of images is running or jogging merely by using vision-based analysis. The posture of the person in the individual images will be similar in either case. Where the first classification step 31 yields one of at least one pre-determined class as a result, indicating uncertainty as to the particular class, further steps 32-34 are carried out to determine a sub-class of the pre-determined class. Thus, where the first classification step 31 yields the result of "either running or jogging", the further steps 32-34 will be carried out to determine which of the two classes is correct. In a first step 32 of these further steps 32-34, an intensity signal is extracted using one of the methods outlined in FIGS. 5 and 6. Then, at least one value of a physiological parameter is determined (step 33) on the basis of data representative of the intensity signal. Then, the exact state is determined (step 34), for example using a set of rules. In an alternative embodiment, a machine learning algorithm is applied to a feature vector based on the intensity signal, and the result of the algorithm is combined with the result of the first classification step 31 to come to a final result.

Figure 5:
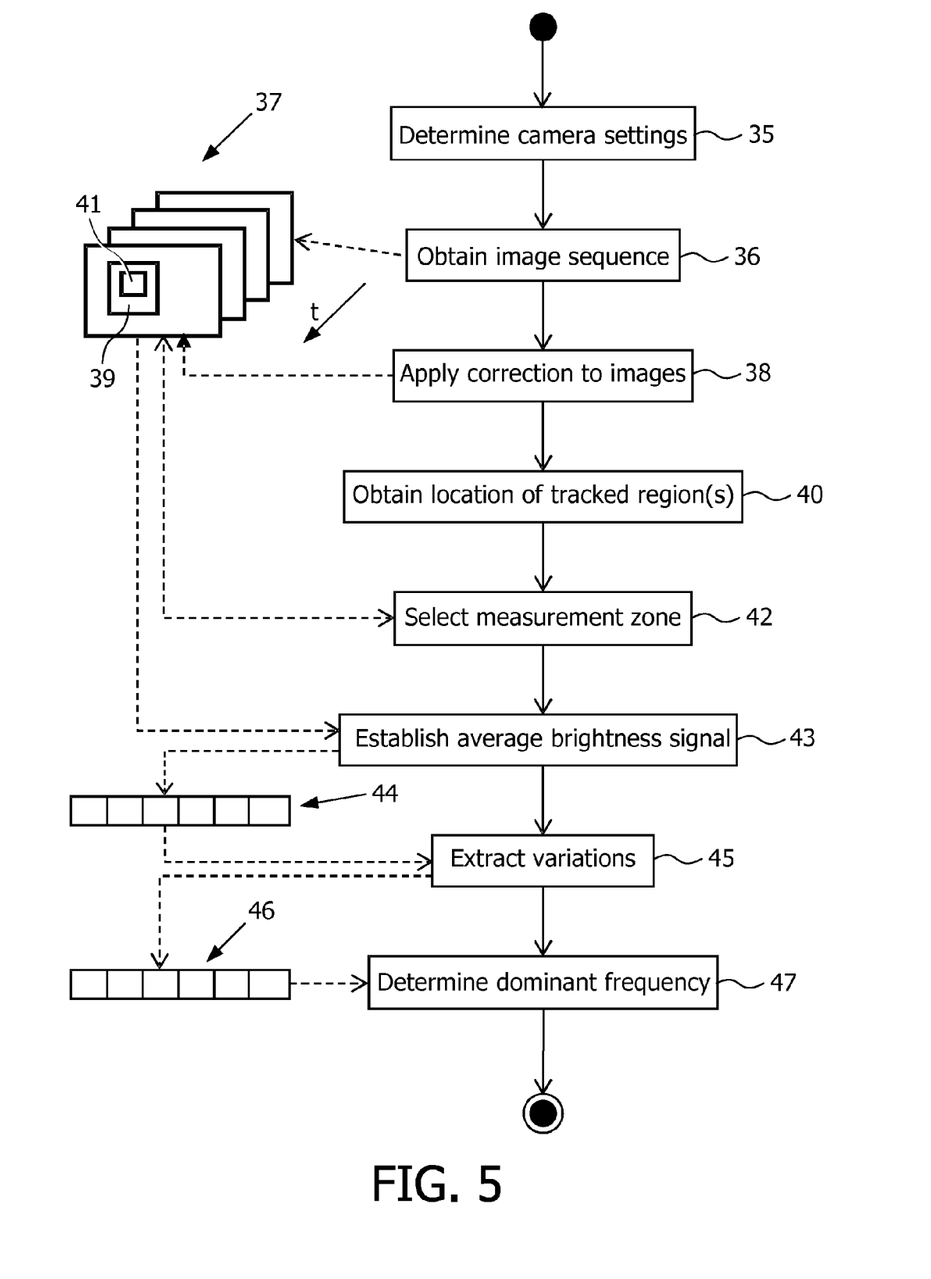
FIG. 5 is a flow chart illustrating steps carried out in one embodiment of the system to obtain values of a physiological parameter.

Turning now to FIG. 5, a first implementation of the steps 21,32 of extracting an intensity signal will be explained in more detail. The illustrated embodiment includes an initialization phase, which can be carried out when the system 1 is started up. In this initialization phase, appropriate settings for the camera 3 are determined (step 35). To this end, the computer 2 causes at least one of the frame rate, exposure time, pixel clock (determines the rate at which pixel values are acquired) and gain of the camera channels of the camera 3 to be varied whilst a sequence of digital images is captured. The (spatial) average brightness of at least part of each image of the sequence is determined, and the magnitude of the periodic fluctuations in the average brightness is determined for each new value of the settings. Those settings at which background fluctuations show at least a local minimum are selected for subsequent use. Instead of determining the spatial average brightness of at least a part of the image, an individual pixel's brightness fluctuations can be determined. The effect of choosing the settings of the camera 3 is that periodic background lighting fluctuations are absent to the largest extent possible from the sequence of images to which the remainder of the method is applied.

In a next step 36, a sequence 37 images is obtained from the camera 3. The sequence 37 of images represents a scene captured at successive points in time, which may be at regular or irregular intervals.

In a next step 38, the images 37 are processed in order to remove non-periodic background signals. To this end, a correction signal corresponding to a time-varying average brightness of part or all of the images 37 is formed. In the illustrated embodiment, the pixel data of the images 37 is then decorrelated from the correction signal. Algorithms for cancelling non-linear cross-correlations are known per se. Further image processing may take place at this stage 38, e.g. to compensate for camera motion.

It is assumed that the first step 14 of FIG. 2 has already been performed, so that a region 39 being tracked has been identified. The location of this region is obtained (step 40).

Subsequently, for each selected and tracked region 39 a measurement zone 41 within the region 39 is selected (step 42). The measurement zone 41 is identified in each image of the sequence 37. Thus, it is determined which pixel of each of the images corresponds to a particular image point of the measurement zone 41 for all image points making up the measurement zone.

Next (step 43), a signal 44 representative of the time-varying average brightness of the pixels corresponding to the image points of the measurement zone 41 is generated. For each image of the sequence 37, the average brightness of the pixels determined to be comprised in the measurement zone 41 is formed. Since each image of the sequence 37 represents a point in time, a time-varying (discrete-time) signal is thus obtained. In an alternative embodiment, certain image points are discarded, so that a sum of pixel values at fewer than all image points in the measurement zone 41 is taken. In one embodiment, a weighted sum of pixel values is used, with at least one channel having a different weight than the other channels. This allows one to overweight the channel tuned to the sub-range of the visible spectrum in which the light source 4 is configured to emit light. In another embodiment, only the values from that channel are used.

The signal 44 is then centered on its mean value (step 45) to yield a further signal 46 representative of the time-varying average brightness of pixels corresponding to the image points of the measurement zone 41, the better to observe variations in it. In a variant, this step 45 also comprises the decorrelation with the correction signal that is alternatively comprised in the step 38. In a different variant, this step 45 comprises a filtering operation, e.g. a filtering operation corresponding to differentiation of the signal. Other alternatives for extracting temporal variations with small amplitudes are possible.

Finally (step 47) basic signal processing techniques are used to extract information representative of the heart rate or respiration rate from the further signal 46. Either one of these, or both, can be extracted, by determining dominant frequencies within ranges typically associated with respiration rate and heart rate, respectively.

Figure 6:
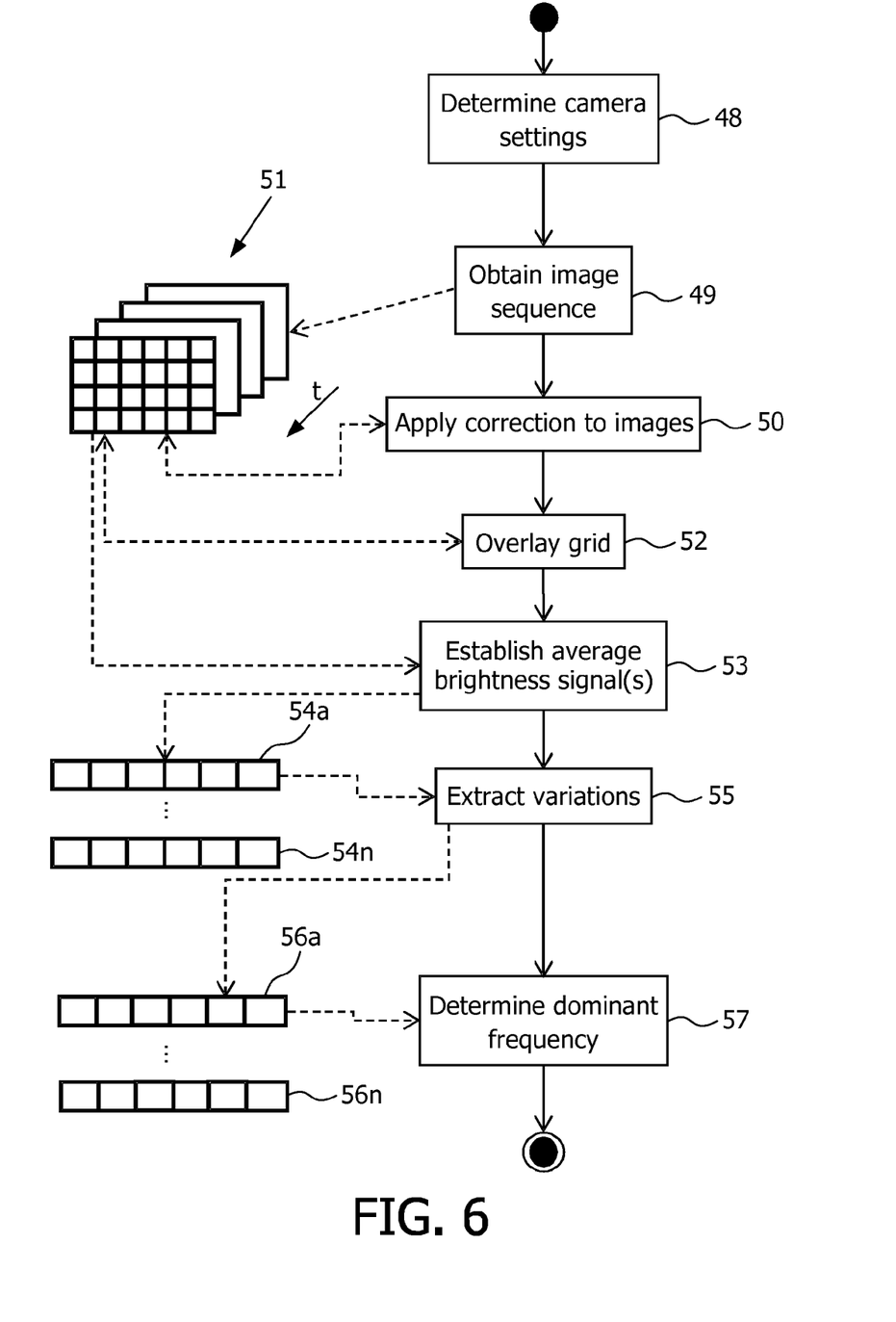
FIG. 6 is a flow chart illustrating an alternative sequence of steps for obtaining values of a physiological parameter.

FIG. 6 illustrates an alternative implementation of the steps 21,32 of extracting an intensity signal for use in determining at least one value of a physiological parameter.

Initial steps 48-50 are similar to the corresponding steps 35,36,38 of the method of FIG. 5. Thus, a sequence 51 of images is obtained (step 49) and corrected (step 50).

However, in a next step 52, a grid is laid over each of the images 51 which grid partitions each image into a plurality of measurement zones, or potential measurement zones. Each measurement zone includes a plurality of image points, i.e. multiple pixel locations.

Then (step 53) at least one, but generally all of the measurement zones are selected, and, for each measurement zone, a respective signal 54a-n corresponding to the time-varying spatial average of brightness values of pixels in the images 51 corresponding to the image points of that measurement zone is established.

Each first signal 54a-n is then centered on its mean value (step 55) to yield a further signal 56a-n representative of the time-varying average brightness of pixels corresponding to the image points of the associated measurement zone, the better to observe variations in it. In a variant, this step 55 also comprises the decorrelation with the correction signal that is alternatively comprised in the earlier step 50 of applying corrections to the images 51. In a different variant, this step 55 comprises a filtering operation, e.g. a filtering operation corresponding to differentiation of the signal. Other alternatives for extracting temporal variations with small amplitudes are possible.

The frequency at which the spectrum of the signal 56a-n has a local maximum within a certain range is then determined (step 57). Again, this step 57 can also involve determining the dominant frequency in two respective ranges, so that values of both the heart rate and the respiration rate are determined, for example.

In this embodiment, it is possible to detect whether more than one person is present in the sequence 51 of images, e.g. by comparing the dominant frequencies determined for each measurement zone or by detecting phase differences between the different intensity signals 54a-n. Since one living being will be tracked with the directable light source 4, the strongest intensity signal 54a-n will be the signal to use in the step 23 (FIG. 3) of building a feature vector or the step 33 of determining at least one value of the physiological parameter in the method of FIG. 4.

The possibility of determining values of physiological parameters of all subjects represented in the sequence 51 of images makes the method of FIG. 6 suitable for implementing the first step 14 in the method of FIG. 2, because it is possible to use the value of the physiological parameter as a criterion for selecting the person whose state is to be determined. In an embodiment therefore, the method of FIG. 6 is used in the first step 14 of FIG. 2 and the method of FIG. 5 is used in the subsequent analysis step 16.

Thus, the methods presented above enable a completely automatic determination of a state of a person represented in a sequence 37,51 of images. This can be a determination of the behavior of a person, where a longer time span is covered by the sequence 37,51, or an action. The method is suitable for surveillance systems for security purposes, in view of its unobtrusive nature. It is also usable as a monitoring system for medical purposes, e.g. to detect whether someone is suffering stroke or the like.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

In an embodiment, the step 15 of tracking at least part of a selected subject represented in a sequence of images with the light source 4, indeed the entire light source 4, is omitted. Instead, the computer 2 analyses a sequence of images to categorize the state of a living being represented therein. This analysis can be done in real time or it can be carried out on a sequence of images that has been recorded.

The invention claimed is:

1. A method of image analysis, comprising:
obtaining a sequence of images; performing a vision-based analysis on at least one of the sequence of images to obtain data for classifying a state of a subject represented in the images;
determining at least one value of a physiological parameter of a living being represented in at least some of the sequence of images, wherein the at least one value of the physiological parameter is determined through analysis of image data from the same sequence of images from which the at least one image on which the vision-based analysis is performed is taken, and wherein the physiological parameter is determined in an unobtrusive manner to the living being in the at least some of the sequence of images; and
classifying a state of the subject using the data obtained with the vision-based analysis and the at least one value of the physiological parameter.

2. The method according to claim 1, wherein classifying the state of the subject comprises classifying an action being undertaken by the subject.

3. The method according to claim 1, wherein separate classifiers are applied to data based on the values of the physiological parameters and data obtained by performing the vision-based analysis.

4. The method according to claim 1, wherein a single classifier is applied to a combination of data based on the values of the physiological parameters and data obtained by performing the vision-based analysis.

5. The method according to claim 1, wherein the at least one value of a physiological parameter of a living being represented in at least some of the sequence of images is obtained using remote photoplethysmographic analysis.

6. The method according to claim 5, including illuminating at least part of the living being with a light source arranged to emit light in a limited sub-range of a visible spectrum.

7. The method according to claim 5, wherein the remote photoplethysmographic analysis includes: selecting at least one measurement zone including a plurality of image points, each image being represented by pixel data, each with at least one associated pixel value in each of the sequence images; and obtaining a signal representative of at least variations in a time-varying value of a combination of pixel values at least a number of associated image points in the measurement zone.

8. The method according to claim 1, including performing vision-based image analysis on the sequence of images to track at least part of a selected subject represented in the sequence of images, and controlling a directable light source illuminating at least part of the selected subject.

9. The method according to claim 8, including selecting the part of the selected subject by analyzing at least some of the pixel data representing at least one of the sequence of images, each image being represented by pixel data.

10. A non-transitory computer readable medium storing a computer program including a set of instructions causing a computer to execute the method according to claim 1.

11. A system for image analysis, comprising:
an interface for obtaining a sequence of images;
a first image analysis system having a processor configured to perform a vision-based analysis on at least one of the sequence of images to obtain data for classifying at least one action of a subject represented in the images; and
a system for determining at least one value of a physiological parameter of a living being represented in at least some of the sequence of images, which system for determining the at least one value of the physiological parameter comprises a second image analysis system for determining the at least one value of the physiological parameter by means of analysis of image data from the same sequence of images from which the at least one image on which the vision-based analysis is performed is taken, wherein the system for image analysis is configured to classify an activity of the subject using the data provided by the first image analysis system and the at least one value of the physiological parameter, and wherein the system is unobtrusive to the living being represented in the at least some of the sequence of images.

12. A method of enabling remote photoplethysmographic analysis, comprising:
obtaining a sequence of images from at least one camera, each represented by pixel data representative of reflected ambient light in at least a limited range of wavelengths;
for at least one measurement zone, providing a signal representative of at least variations in a time-varying value of a combination of pixel values at least a number of image points in the measurement zone for use in determining at least one value of a physiological parameter; and tracking at least part of a selected subject represented in the sequence of images, and controlling a directable light source illuminating at least part of the selected subject, wherein the method is unobtrusive to the selected subject represented in the sequence of images.

13. The method according to claim 12, wherein the directable light source is fixed in position relative to the camera, and wherein controlling the directable light source includes controlling a device for changing a viewing direction of the camera.

14. A system for enabling remote photoplethysmographic analysis, comprising:
- at least one camera interface for obtaining a sequence of images from at least one camera, each image represented by pixel data representative of reflected ambient light in at least a limited range of wavelengths; and
- a system for processing the pixel data, configured to provide, for at least one measurement zone, a signal representative of at least variations in a time-varying value of a combination of pixel values at least a number of image points in the measurement zone for use in determining at least one value of a physiological parameter;
- a system for tracking at least part of a selected subject represented in the sequence of images, wherein the system is unobtrusive to the selected subject represented in the sequence of images; and
- a system for controlling a directable light source illuminating at least part of the selected subject.

* * * * *